United States Patent
Park et al.

(10) Patent No.: US 9,804,468 B2
(45) Date of Patent: Oct. 31, 2017

(54) LIQUID CRYSTAL DISPLAY

(71) Applicant: Samsung Display Co., Ltd., Yongin, Gyeonggi-Do (KR)

(72) Inventors: Seung Hyun Park, Seoul (KR); Woong Ki Jeon, Yongin-si (KR); Sung In Ro, Hwaseong-si (KR); Dong Gun Oh, Osan-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 15/286,697

(22) Filed: Oct. 6, 2016

(65) Prior Publication Data
US 2017/0023813 A1 Jan. 26, 2017

Related U.S. Application Data

(63) Continuation of application No. 14/560,018, filed on Dec. 4, 2014, now Pat. No. 9,465,270.

(30) Foreign Application Priority Data

Jan. 24, 2014 (KR) ........................ 10-2014-0008735

(51) Int. Cl.
*G02F 1/136* (2006.01)
*G02F 1/137* (2006.01)
(Continued)

(52) U.S. Cl.
CPC .......... *G02F 1/137* (2013.01); *G02F 1/13439* (2013.01); *G02F 1/133345* (2013.01);
(Continued)

(58) Field of Classification Search
CPC ............... G02F 1/137; G02F 1/133345; G02F 1/134309; G02F 1/13439; G02F 1/136209;
(Continued)

(56) References Cited

U.S. PATENT DOCUMENTS 6,545,359 B1 * 4/2003 Ohtani .............. H01L 23/53223
257/758
7,098,086 B2 * 8/2006 Shibata ............... G02F 1/13454
438/149
(Continued)

FOREIGN PATENT DOCUMENTS

KR 1020080034634 A 4/2008
KR 100828456 B1 5/2008
(Continued)

*Primary Examiner* — Donald Raleigh
(74) *Attorney, Agent, or Firm* — Cantor Colburn LLP

(57) ABSTRACT

A liquid crystal display includes: a gate line including a gate electrode; a data line including a source electrode; a drain electrode; an organic layer on the gate and data lines and the drain electrode, and a first opening defined therein; a first electrode on the organic layer, and a second opening defined therein; and a passivation layer on the first electrode, and a contact hole defined therein exposing the drain electrode. An interval taken in a first direction between a first edge of the gate electrode, the first edge parallel to a second direction in which the gate line is extended and which is different than the first direction, and a second edge of the first electrode second opening, the second edge parallel to the second direction and adjacent to the gate electrode first edge is 0 micrometer to about 6 micrometers.

10 Claims, 14 Drawing Sheets

(51) Int. Cl.
  *G02F 1/1362* (2006.01)
  *G02F 1/1333* (2006.01)
  *G02F 1/1343* (2006.01)
  *G02F 1/1335* (2006.01)
  *G02F 1/1368* (2006.01)

(52) U.S. Cl.
  CPC .. *G02F 1/134309* (2013.01); *G02F 1/136209* (2013.01); *G02F 1/136286* (2013.01); *G02F 1/1368* (2013.01); *G02F 1/133512* (2013.01); *G02F 1/133514* (2013.01); *G02F 1/134363* (2013.01); *G02F 1/136227* (2013.01); *G02F 2001/133519* (2013.01); *G02F 2001/136295* (2013.01); *G02F 2201/121* (2013.01); *G02F 2201/123* (2013.01); *G02F 2201/40* (2013.01)

(58) Field of Classification Search
  CPC ... G02F 1/136286; G02F 2001/133519; G02F 1/1368; G02F 1/136227; G02F 2001/136295; G02F 2201/123; G02F 2201/121

See application file for complete search history.

(56) References Cited

U.S. PATENT DOCUMENTS

| | | | |
|---|---|---|---|
| 7,532,280 | B2 | 5/2009 | Yoshida et al. |
| 8,120,030 | B2 | 2/2012 | Godo et al. |
| 2002/0180920 | A1* | 12/2002 | Noh ............... G02F 1/134363 349/141 |
| 2005/0030461 | A1* | 2/2005 | Ono ............... G02F 1/133345 349/141 |
| 2011/0273651 | A1 | 11/2011 | Kim et al. |

FOREIGN PATENT DOCUMENTS

| | | |
|---|---|---|
| KR | 1020100066219 A | 6/2010 |
| KR | 1020130015734 A | 2/2013 |

\* cited by examiner

LIQUID CRYSTAL DISPLAY

This application is a continuation application of U.S. patent application Ser. No. 14/560,018 filed on Dec. 4, 2014, which claims priority to Korean Patent Application No. 10-2014-0008735 filed on Jan. 24, 2014, and all the benefits accruing therefrom under 35 U.S.C. §119, the entire contents of which are incorporated herein by reference.

BACKGROUND (a) Field

The invention relates to a liquid crystal display.

(b) Description of the Related Art

A liquid crystal display is one of a number of flat panel displays. The liquid crystal display is a display device including a liquid crystal layer and adjusts the amount of transmitted light therethrough by applying a voltage to an electrode and rearranging liquid crystal molecules of the liquid crystal layer.

A liquid crystal display, in which a pixel electrode and a common electrode are disposed on one base substrate of a single display panel, attracts attention as a method of improving transmittance and implementing a wide viewing angle.

SUMMARY

A liquid crystal display, in which a pixel electrode and a common electrode are disposed on one base substrate adopts a method of rotating liquid crystal molecules arranged in a horizontal direction with respect to a surface of the base substrate by using an electric field formed in the horizontal direction.

A liquid crystal display includes a switching element such as a thin film transistor. The switching element may include various terminals such as gate, source and drain electrodes. In using an electric field formed in the horizontal direction described above, the liquid crystal molecules located around the gate electrode are unnecessarily rotated according to a difference in a voltage between the gate electrode and the drain electrode of the switching element, thereby generating light leakage.

In order to reduce or effectively prevent light leakage, a light blocking member is disposed overlapping the gate electrode. Where a width of the light blocking member is increased, an aperture ratio of the liquid crystal display is undesirably decreased. Therefore, there remains a need to reduce or effectively prevent light leakage at a region around a gate electrode, without unduly increasing a width of a light blocking member.

The invention provides a liquid crystal display having advantages of reducing or effectively preventing light leakage generated in a region around a gate electrode, thereby decreasing a width of the light blocking member even though a pixel electrode and a common electrode are disposed on one base substrate of a single collective display panel.

An exemplary embodiment of the invention provides a liquid crystal display, including: a first substrate; a gate line on the first substrate and including a gate electrode; a data line on the first substrate and including a source electrode; a drain electrode on the first substrate; an organic layer on the gate line, the data line and the drain electrode, and a first opening a first opening defined in the organic layer; a first electrode on the organic layer, and a second opening defined in the first electrode; a passivation layer on the first electrode, and a contact hole defined in the passivation layer and exposing the drain electrode; and a second electrode on the passivation layer. An interval taken in a first direction between a first edge among edges of the gate electrode, the first edge parallel to a second direction in which the gate line is extended and which is different than the first direction, and a second edge among edges of the first electrode second opening, the second edge parallel to the second direction and adjacent to the gate electrode first edge, is about 0 micrometer (μm) to about 6 micrometers (μm).

The contact hole may overlap the first opening and the second opening.

The first electrodes may have a plate shape, the second electrode may include a plurality of branch electrodes, and the plurality of branch electrodes of the second electrode may overlap the first electrode.

The second opening may include a first expanded portion extended in the first direction, and smaller in the second direction than a remainder of the second opening in the second direction, and a first interval taken in the first direction between a second direction extended distal edge of the first expanded portion and the first opening, may be larger than a second interval taken in the first direction between the second opening second edge adjacent to the gate electrode first edge and the first opening.

A difference between the first interval and the second interval may be about 1 μm to about 5 μm.

The drain electrode may include a second expanded portion overlapping the first expanded portion, and extended in the first direction further than the distal edge of the first expanded portion.

A maximum interval between a second direction extended distal third edge of the second expanded portion, and an organic layer first opening edge among edges of the first opening adjacent to the second expanded portion may be about 1 μm to about 10 μm.

The drain electrode may include a third expanded portion extended in the first direction from the second expanded portion, and larger in the second direction than a remainder of the second expanded portion in the second direction.

A minimum interval between a second direction extended a third edge of the drain electrode third expanded portion, and the organic layer first opening edge among edges of the first opening adjacent to the third expanded portion may be about 1 μm to about 10 μm.

In a top plan view, the third expanded portion may have a polygonal shape including only straight portions.

In a top plan view, the third expanded portion may include a straight portion and a curved portion.

According to one or more exemplary embodiment of the liquid crystal display according to the invention, light leakage generated in a surrounding region of the gate electrode may be reduced or effectively prevented, even though the first and second electrodes (e.g., the common and pixel electrodes) are disposed on one base substrate within a single display panel, thereby decreasing a width of a light blocking member.

BRIEF DESCRIPTION OF THE DRAWINGS

The above and other advantages and features of this disclosure will become more apparent by describing in further detail exemplary embodiments thereof with reference to the accompanying drawings, in which.

DETAILED DESCRIPTION

Figure 1:
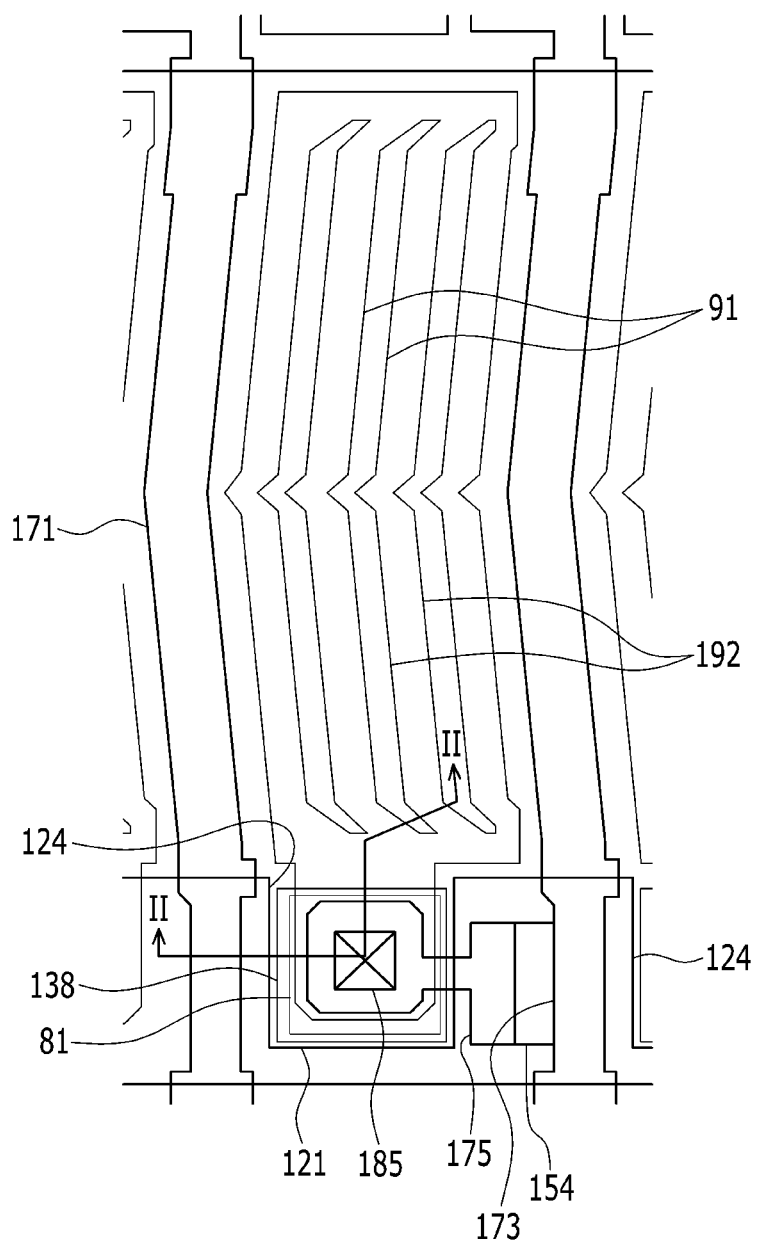
FIG. 1 is a top plan view of an exemplary embodiment of a liquid crystal display according to the invention.

The invention will be described more fully hereinafter with reference to the accompanying drawings, in which exemplary embodiments of the invention are shown. As those skilled in the art would realize, the described exemplary embodiments may be modified in various different ways, all without departing from the spirit or scope of the invention.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Exemplary embodiments of a liquid crystal display according to the invention will be described with reference to the drawings.

First, an exemplary embodiment of a liquid crystal display according to the invention will be described with reference to FIGS. 1 and 2.

Figure 2:
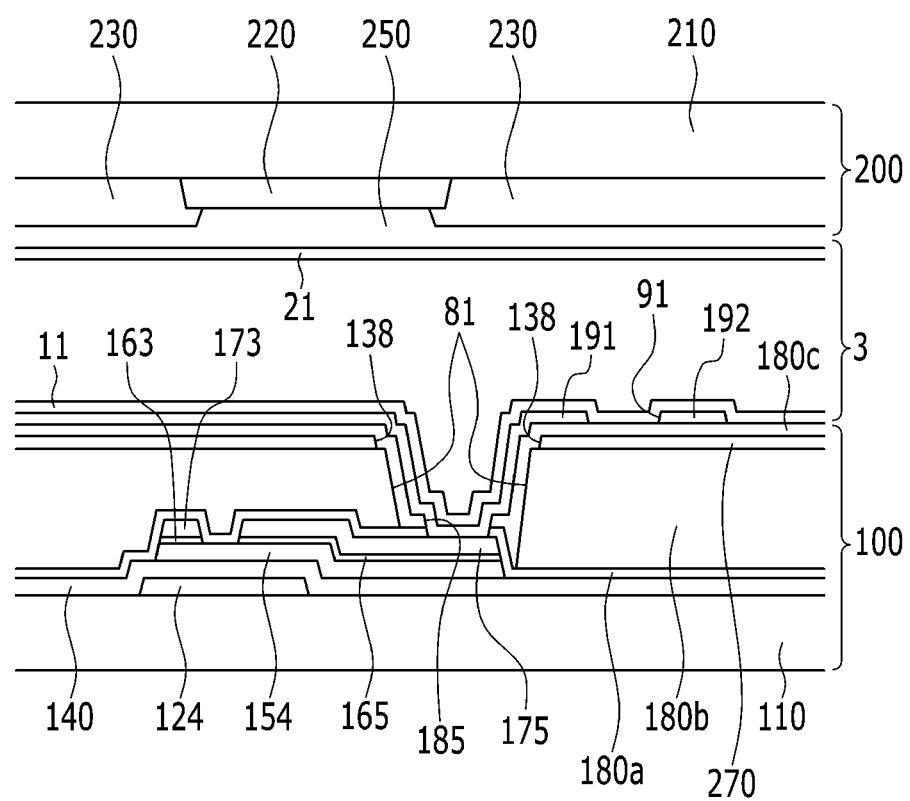
FIG. 2 is a cross-sectional view of the liquid crystal display taken along line II-II of FIG. 1.

Referring to FIGS. 1 and 2, the liquid crystal display includes a lower panel 100 and an upper panel 200, which face each other, and a liquid crystal layer 3 inserted therebetween. The lower and upper panels 100 and 200 may otherwise be referred to as display substrates or display panels.

First, the lower panel 100 will be described.

A gate conductor including a gate line 121 is disposed on a first substrate 110 including transparent glass, plastic, or the like.

The gate line 121 includes a gate electrode 124, and a wide distal end portion (not illustrated) for connection with another layer or an external driving circuit. The gate line 121 may include an aluminum-based metal, such as aluminum (Al) or an aluminum alloy, a silver-based metal, such as silver (Ag) or a silver alloy, a copper-based metal, such as copper (Cu) or a copper alloy, a molybdenum-based metal, such as molybdenum (Mo) or a molybdenum alloy, chromium (Cr), tantalum (Ta), and titanium (Ti). However, the gate line 121 may have a multilayered structure including at least two conductive layers having different physical properties.

A gate insulating layer 140 including silicon nitride (SiNx), silicon oxide (SiOx), or the like is disposed on the gate conductor 121. The gate insulating layer 140 may have a multilayered structure including at least two insulating layers having different physical properties.

A semiconductor 154 including amorphous silicon, polysilicon or the like is disposed on the gate insulating layer 140. The semiconductor 154 may include an oxide semiconductor.

Ohmic contacts 163 and 165 are disposed on the semiconductor 154. The ohmic contacts 163 and 165 may include a material, such as n+ hydrogenated amorphous silicon in which an n-type impurity, such as phosphorus, is doped at a high concentration, or silicide. The ohmic contacts 163 and 165 may form a pair of ohmic contacts disposed on the semiconductor 154. Where the semiconductor 154 is the oxide semiconductor, the ohmic contacts 163 and 165 may be omitted.

The data conductor including a data line 171 including a source electrode 173, and a drain electrode 175 is disposed on the ohmic contacts 163 and 165 and the gate insulating layer 140.

The data line 171 includes a wide distal end portion (not illustrated) for connection with another layer or an external driving circuit. The data line 171 transfers a data signal and mainly extends in a vertical direction to cross the gate line 121.

In the top plan view, the data line 171 may have a bent shape in order to obtain maximum transmittance of the liquid crystal display. First portions of the data line 171 may meet in a middle region of a pixel region to form a V shape, and may be referred to as first curved portions. A second portion, which is bent so as to have a predetermined angle with the first curved portions, may be further disposed at edge regions of the pixel region. The second portion may otherwise be referred to as a second curved portion and may include the source electrode 173.

The source electrode 173 is a portion of the data line 171, and disposed aligned substantially on the same extension line as that of the data line 171. The drain electrode 175 is disposed so as to extend elongated parallel to an extension direction the source electrode 173. Accordingly, the drain electrode 175 is parallel to a portion of the data line 171.

The gate electrode 124, the source electrode 173 and the drain electrode 175 form a thin film transistor ("TFT") together with the semiconductor 154. A channel of the TFT is formed in a portion of the semiconductor 154 which is exposed between the source electrode 173 and drain electrode 175.

The exemplary embodiment of the liquid crystal display according to the invention may include the source electrode 173 positioned on the same extension line as that of the data line 171 and the drain electrode 175 extending elongated parallel to the data line 171 to increase a width of the TFT without increasing a planar area occupied by the data conductor, thus increasing an aperture ratio of the liquid crystal display.

The data line 171 and the drain electrode 175 may include refractory metal, such as molybdenum, chromium, tantalum and titanium, or an alloy thereof, and may have a multilayered structure including a refractory metal layer (not illustrated) and a low resistance conductive layer (not illustrated). Examples of the multilayered structure may include a double layer of a chromium or molybdenum (alloy) lower layer and an aluminum (alloy) upper layer, and a triple layer of a molybdenum (alloy) lower layer, an aluminum (alloy) middle layer, and a molybdenum (alloy) upper layer.

A first passivation layer 180a is disposed on the data conductors 171, 173 and 175, the gate insulating layer 140, and the exposed portion of the semiconductor 154. The first passivation layer 180a may include an organic insulating material, an inorganic insulating material or the like.

An organic layer 180b is disposed on the first passivation layer 180a. The organic layer 180b may include an organic insulating material. A first opening 81 is defined in the organic layer 180b at a vicinity of the drain electrode 175.

The organic layer 180b may be a color filter. Where the organic layer 180b is a color filter, the organic layer 180b may intrinsically display any one of primary colors. Examples of the primary colors may include three primary colors, such as red, green and blue, or yellow, cyan and magenta, or the like. Although not illustrated in the drawings, the color filter may further display a mixed color of the primary colors and/or white in addition to the primary colors.

A common electrode 270 is disposed on the organic layer 180b. The common electrode 270 is a first electric field generating electrode of the display panel. The common electrode 270, which has a planar shape, may be disposed on the first substrate 110 in a form of a plate, and a second opening 138 may be defined in the common electrode 270 at a region corresponding to the vicinity of the drain electrode 175. That is, the common electrode 270 may have a planar plate shape.

In a display area of the liquid crystal display, a pixel region may be disposed within a pixel. Common electrodes 270 disposed in adjacent pixels may be connected to each other to each receive a common voltage having a predetermined size supplied from the outside of the display area.

A second passivation layer 180c is disposed on the common electrode 270. The second passivation layer 180c may include an organic insulating material, an inorganic insulating material or the like.

A pixel electrode 191 is disposed on the second passivation layer 180c. The pixel electrode 191 includes a curved edge which is substantially parallel to the first and second curved portions of the data line 171. A plurality of cutouts 91 is defined in the pixel electrode 191, such that a plurality of branch electrodes 192 is defined by the plurality of cutouts 91.

A first contact hole 185 exposing the drain electrode 175 is defined in the first passivation layer 180a, the organic layer 180b and the second passivation layer 180c. The pixel electrode 191 is physically and electrically connected to the drain electrode 175 via the first contact hole 185 to receive a voltage from the drain electrode 175.

The first contact hole 185 is disposed at a position overlapping the first opening 81 of the organic layer 180b and the second opening 138 of the common electrode 270.

A first alignment layer 11 is disposed on the pixel electrode 191 and the second passivation layer 180c. The first alignment layer 11 includes a photoreactive material Then, the upper panel 200 will be described.

A light blocking member 220 is disposed on a second substrate 210 including transparent glass, plastic or the like. The light blocking member 220 may otherwise be referred to as a black matrix and is configured to reduce or effectively prevent light leakage.

A plurality of color filters 230 is also disposed on the second substrate 210. Where the organic layer 180b of the lower panel 100 is a color filter, the color filter 230 in the upper panel 200 may be omitted. Further, the light blocking member 220 disclosed in the upper panel 200 may alternatively be disposed in the lower panel 100.

An overcoat 250 is disposed on the color filter 230 and the light blocking member 220. The overcoat 250 may include an (organic) insulating material, is configured to reduce or effectively prevent exposure of the color filter 230, and provides a flat surface in the upper panel 200. In an alternative exemplary embodiment, the overcoat 250 may be omitted.

A second alignment layer 21 is disposed on the overcoat 250. The second alignment layer 21 includes a photoreactive material.

The liquid crystal layer 3 includes a liquid crystal material having positive dielectric anisotropy or negative dielectric anisotropy.

The liquid crystal molecules of the liquid crystal layer 3 are arranged so that axes thereof are arranged parallel to the lower and upper panels 100 and 200.

The pixel electrode 191 receives a data voltage from the drain electrode 175, and the common electrode 270 receives a common voltage having a predetermined size from a common voltage applying part (not shown) disposed outside the display area of the liquid crystal display.

The pixel electrode 191 and the common electrode 270, which are field generating electrodes, generate an electric field, so that the liquid crystal molecules of the liquid crystal layer 3 positioned on the two electric field generating electrodes 191 and 270 are rotated in a direction parallel to a direction of the electric field. Polarization of light passing through the liquid crystal layer is changed according to the determined direction of the rotation of the liquid crystal molecules.

As described above, the two electric field generating electrodes 191 and 270 are disposed within the single lower panel 100, so that transmittance of the liquid crystal display may be improved and a wide viewing angle may be implemented.

According to the exemplary embodiment of the liquid crystal display according to the invention, the common electrode 270 has a plane planar shape, and the pixel electrode 191 includes the plurality of branch electrodes. According to an alternative exemplary embodiment of a liquid crystal display according to the invention, the pixel electrode 191 may have a plane planar shape, and the common electrode 270 may have a plurality of branch electrodes.

The invention is applicable to all structures in which two electric field generating electrodes are each on the single first substrate 110 and overlap with an insulating layer interposed therebetween, the first electric field generating electrode disposed under the insulating layer has a plane planar shape, and the second electric field generating electrode disposed on (e.g., above) the insulating layer has the plurality of branch electrodes.

Figure 3:
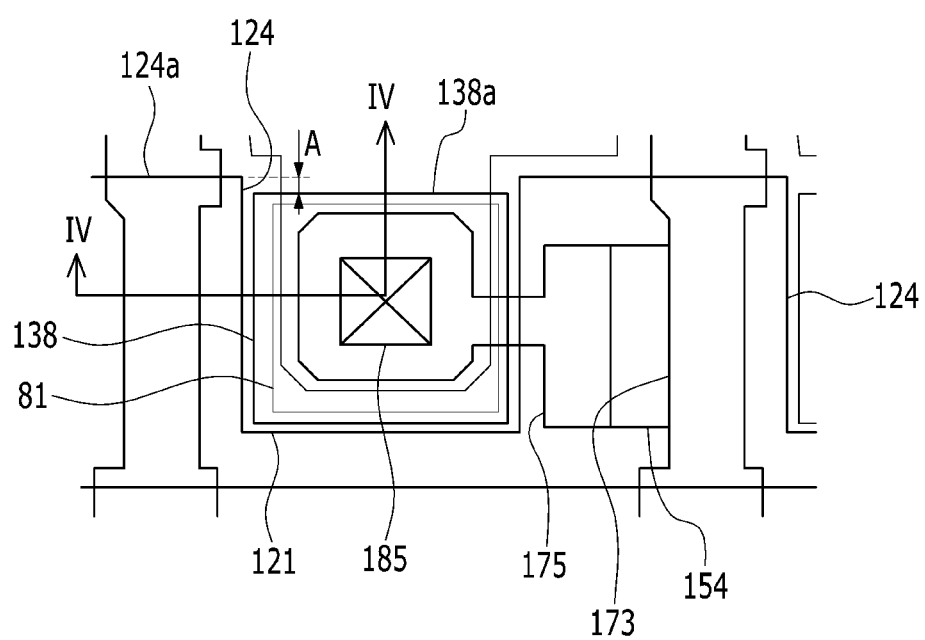
FIG. 3 is a top plan view illustrating an enlarged portion of the liquid crystal display of FIG. 1.

A portion of the liquid crystal display of FIGS. 1 and 2 will be described with reference to FIGS. 3 and 4 together with FIGS. 1 and 2. FIG. 3 is a top plan view illustrating an enlarged portion of the liquid crystal display of FIG. 1, and FIG. 4 is a cross-sectional view taken along line IV-IV of FIG. 3.

Referring to FIG. 3, a first interval A between the second opening 138 of the common electrode 270, and the gate electrode 124, is about 0 micrometer (μm) to about 6 micrometers (μm). More particularly, an interval taken perpendicularly (e.g., first direction) between a first edge 124a parallel to the gate line 121 among edges of the gate electrode 124 and a second edge 138a adjacent to the first edge 124a of the gate electrode 124 among edges parallel to the gate line 121 among edges of the second opening 138 of the common electrode 270 is about 0 μm to about 6 μm. That is, in the top plan view, the second edge 138a of the second opening 138 of the common electrode 270 is disposed to be closer to the drain electrode 175 than the first edge 124a of the gate electrode 124.

Referring to FIG. 3, the data line 171 extends in the first direction. A maximum width of the second opening 138 of the common electrode 270 is defined in the first direction. A maximum and minimum width of the gate line 121 are each defined in the first direction. As illustrated in FIG. 3, the maximum width of the gate line 121 is greater than a sum of the minimum width of the gate line 121 and the maximum width of the second opening 138.

Figure 4:
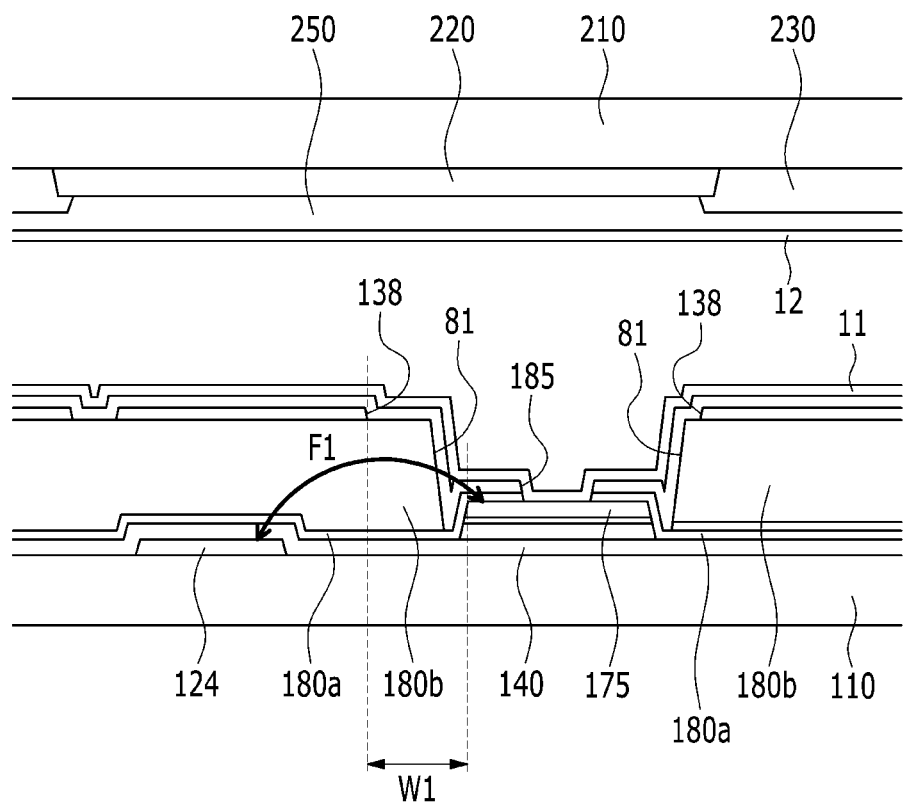
FIG. 4 is a cross-sectional view taken along line IV-IV of FIG. 3.

Referring to FIG. 4, even where the liquid crystal display is in an off state while a gate-on signal and a gate-off signal are applied to the gate electrode 124, a first electric field F1 may be generated between the gate electrode 124 and the drain electrode 175. The liquid crystal molecules overlapping the gate electrode 124 may be influenced from the first electric field F1 near the gate electrode 124. Since the gate-on signal has a larger size than that of the data voltage applied to the drain electrode 175, intensity of the first electric field F1 generated by the gate-on signal is relatively large compared to the data voltage applied to the drain electrode 175. Accordingly, the liquid crystal molecules of the liquid crystal layer positioned around the region corresponding to the gate electrode 124 may be unnecessarily rotated due to an influence of the first electric field F1, thereby generating light leakage.

In order to reduce or effectively prevent light leakage, the light blocking member 220 is relatively widely disposed so as to cover (e.g., overlap) even the region around the gate electrode 124. However, when the light blocking member 220 is widely disposed, an aperture ratio of the liquid crystal display deteriorates.

However, according to one or more exemplary embodiment of the liquid crystal display according to the invention, the second edge 138a of the second opening 138 of the common electrode 270 is disposed to be adjacent to the first edge 124a of the gate electrode 124, and the second edge 138a of the second opening 138 of the common electrode 270 is disposed to be closer to the drain electrode 175 than the first edge 124a of the gate electrode 124, so that an interval W1 taken in a second direction perpendicular to the first direction and between a first direction extending edge of the second opening 138 of the common electrode 270 and the drain electrode 175 may be relatively narrow. Accordingly, a portion of the common electrode 270 may be disposed in and cover a portion adjacent to the gate electrode 124. Since the common voltage is applied to the common electrode 270, it is possible to reduce or effectively prevent the first electric field F1 generated near the gate electrode 124 from influencing the liquid crystal layer 3 near the gate electrode 124.

Accordingly, unnecessary rotation of the liquid crystal molecules of the liquid crystal layer positioned around the region corresponding to the gate electrode 124 due to the influence of the first electric field F1 may be reduced or effectively prevented, thereby reducing or effectively preventing light leakage in the liquid crystal display. Accordingly, even without forming the light blocking member 220 to be relatively wide in the top plan view, light leakage may be reduced or effectively prevented without decreasing the aperture ratio of the liquid crystal display.

Figure 5:
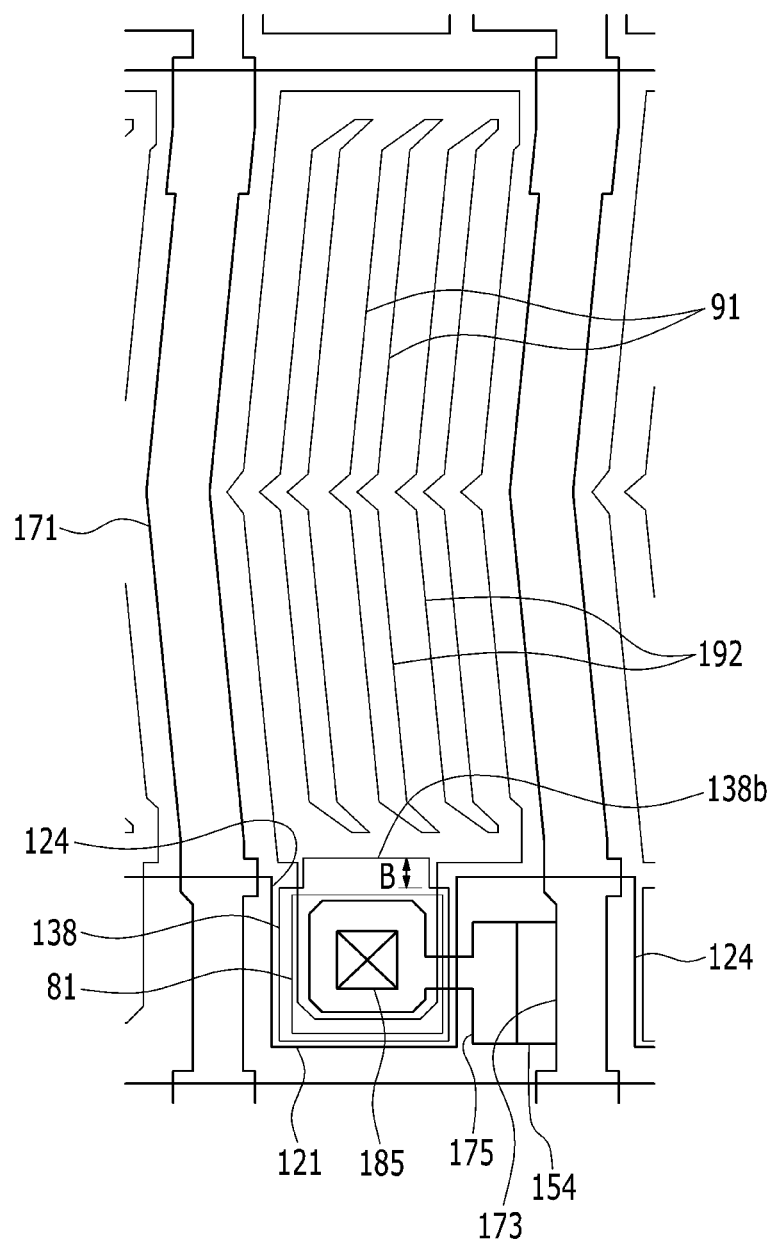
FIG. 5 is a top plan view of another exemplary embodiment of a liquid crystal display according to the invention.

A liquid crystal display according to the invention will be described with reference to FIGS. 5 and 6. FIG. 5 is a top plan view of another exemplary embodiment of a liquid crystal display according to the invention, and FIG. 6 is a top plan view illustrating an enlarged portion of the liquid crystal display of FIG. 5.

Figure 6:
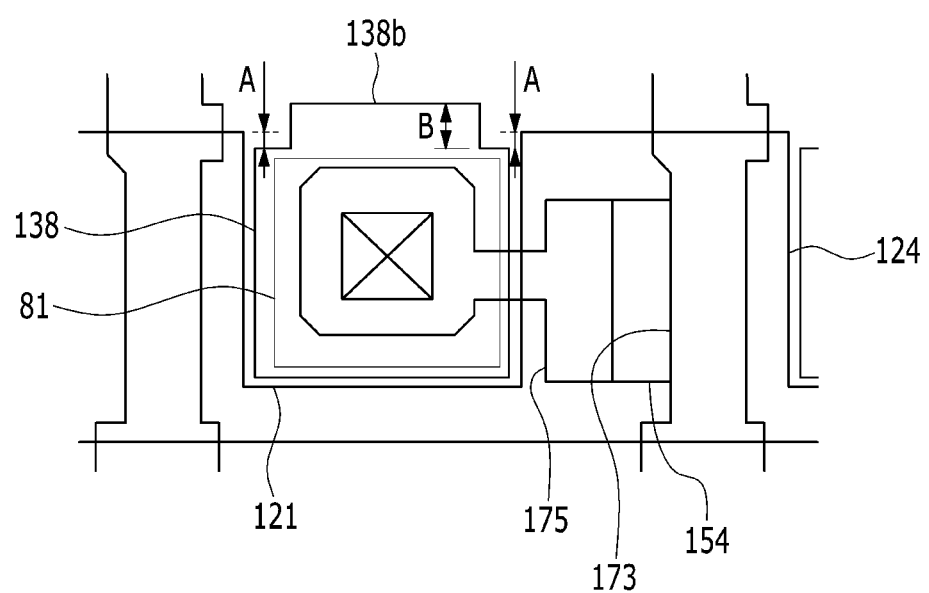
FIG. 6 is a top plan view illustrating an enlarged portion of the liquid crystal display of FIG. 5.

Referring to FIGS. 5 and 6, the liquid crystal display is substantially the same as the liquid crystal display with reference to FIGS. 1 to 4. A detailed description of the similar constituent elements will be omitted.

Referring to FIGS. 5 and 6, similar to the liquid crystal display described with reference to FIGS. 1 to 4, a first direction first interval A between a second opening 138 of a common electrode 270, and a gate electrode 124, at a portion adjacent to the gate electrode 124 is about 0 μm to about 6 μm. More particularly, the first interval A taken perpendicularly (e.g., the first direction) between a first edge 124a parallel to the gate line 121 among edges of the gate electrode 124 and a second edge 138a adjacent to the first edge 124a of the gate electrode 124 among edges parallel to the gate line 121 among edges of the second opening 138 of the common electrode 270 is about 0 μm to about 6 μm. That is, in the top plan view, the second edge 138a of the second opening 138 of the common electrode 270 is disposed to be closer to the drain electrode 175 than the first edge 124a of the gate electrode 124.

However, in the liquid crystal display described with reference to FIGS. 5 and 6, unlike the exemplary embodiment described with reference to FIGS. 1 to 4, the second opening 138 of the common electrode 270 includes a first expanded portion 138b. That is, the second opening 138 includes the first expanded portion 138b positioned at a center portion of the second opening 138 with respect to the second direction and spaced apart from a first direction extending second opening 138 edge portion adjacent to the gate electrode 124. For the first expanded portion 138b, a first direction interval between a first opening 81 of an organic layer 180b and the second opening 138 of the common electrode 270 is larger than a first direction interval between the first opening 81 and the second opening 138 at the second edge 138a adjacent to the gate electrode 124. More particularly, a first direction difference B between the interval between the edge of the first expanded portion 138b and the first opening 81 of the organic layer 180b, and an interval between the first opening 81 and the second opening 138 at the second edge 138a adjacent to the gate electrode 124, is about 1 μm to about 5 μm.

As described above, the interval between the first opening 81 of the organic layer 180b and the second opening 138 of the common electrode 270 at the first expanded portion 138b is disposed to be relatively wide, so that mislocation of the second opening 138 of the common electrode 270 by a step difference of the organic layer 180b may be reduced or effectively prevented.

In an exemplary embodiment of a method of manufacturing a liquid crystal display, when the second opening 138 of the common electrode 270 is formed, and a photosensitive film is subsequently stacked on the common electrode 270 and exposed, a cross-sectional thickness of the photosensitive film stacked on the common electrode 270 at a portion adjacent to the first opening 81 of the organic layer 180b is increased by the step difference of the organic layer 180b, and thus a pattern of the photosensitive film may not be accurately formed at the portion adjacent to the first opening 81 of the organic layer 180b by a same quantity of exposure. Accordingly, where the interval between the second opening 138 of the common electrode 270 and the first opening 81 of the organic layer 180b is relatively small, the pattern of the photosensitive film is not accurately formed, so that the second opening 138 of the common electrode 270 may not be formed at an accurate position.

However, according to one or more exemplary embodiment of the liquid crystal display according to the invention, the first direction interval between the first opening 81 of the organic layer 180b and the second opening 138 of the common electrode 270 at the first expanded portion 138b is disposed to be relatively wide, so that mislocation of the second opening 138 of the common electrode 270 by the step of the organic layer 180b may be reduced or effectively prevented.

Further, as described above, the first direction first interval A that is taken perpendiculary between the first edge 124a parallel to the gate line 121 among the edges of the gate electrode 124, and the second opening 138 second edge 138a adjacent to the first edge 124a of the gate electrode 124 among the edges parallel to the gate line 121 of the second opening 138 of the common electrode 270 in the portion adjacent to the gate electrode 124 is about 0 μm to about 6 μm. That is, the second edge 138a of the second opening 138 of the common electrode 270 is disposed to be closer to the drain electrode 175 than the first edge 124a of the gate electrode 124.

As described above, according to one or more exemplary embodiment of the liquid crystal display according to the invention, the second edge 138a of the second opening 138 of the common electrode 270 is disposed to be adjacent to the first edge 124a of the gate electrode 124, and the second edge 138a of the second opening 138 of the common electrode 270 is disposed to be closer to the drain electrode 175 than the first edge 124a of the gate electrode 124 in the top plan view, so that a second direction interval W1 between the first direction extending edge of the second opening 138 of the common electrode 270 and the drain electrode 175 may be disposed to be relatively narrow. Accordingly, a portion of the common electrode 270 may be disposed in and cover a portion adjacent to the gate electrode 124. Since the common voltage is applied to the common electrode 270, it is possible to reduce or effectively prevent the electric field generated near the gate electrode 124 from influencing the liquid crystal layer 3 near the gate electrode 124. Accordingly, unnecessary rotation of the liquid crystal molecules of the liquid crystal layer positioned around the region corresponding to the gate electrode 124 due to the influence of the first electric field F1 may be reduced or effectively prevented, thereby reducing or effectively preventing light leakage in the liquid crystal display. Accordingly, even without forming the light blocking member 220 to be relatively wide in the top plan view, light leakage may be reduced or effectively prevented without decreasing the aperture ratio of the liquid crystal display.

All of the aforementioned characteristics of the liquid crystal display described with reference to FIGS. 1 to 4 are applicable to the liquid crystal display described with reference to FIGS. 5 and 6.

Figure 7:
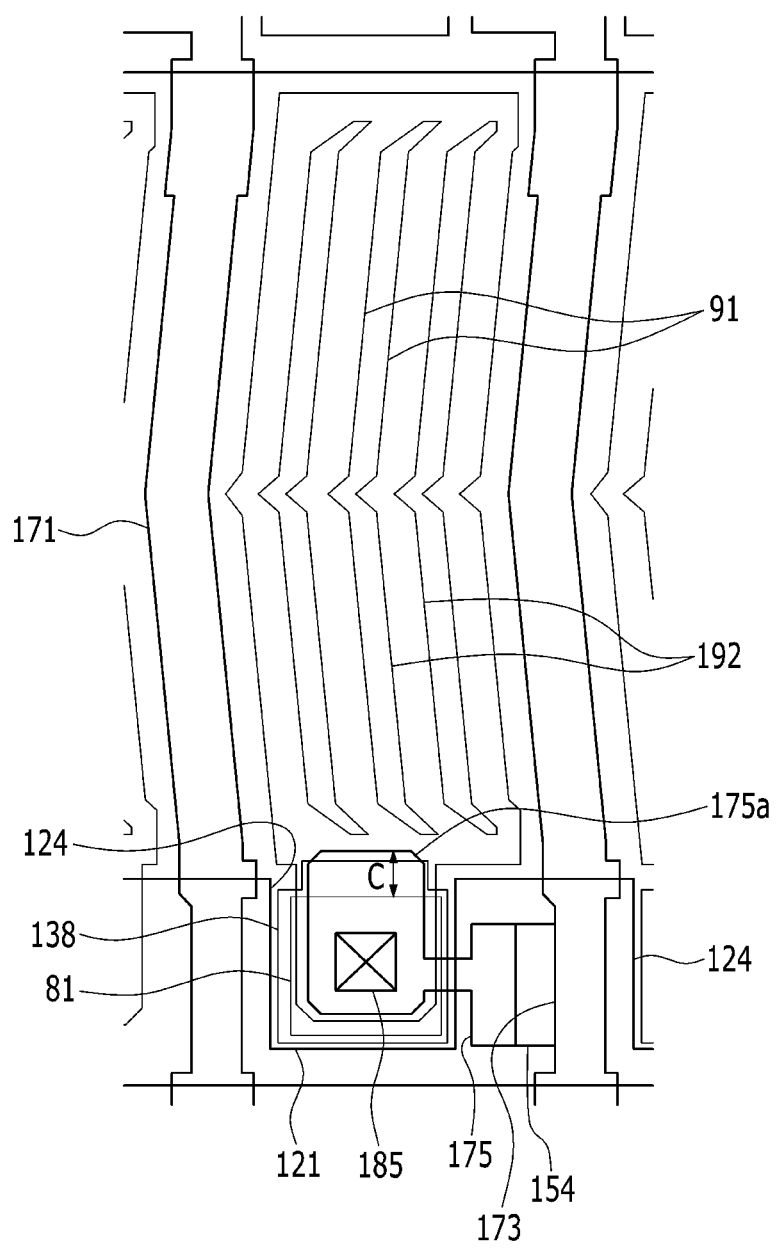
FIG. 7 is a top plan view of still another exemplary embodiment of a liquid crystal display according to the invention.

A liquid crystal display according to the invention will be described with reference to FIGS. 7 and 8. FIG. 7 is a top plan view of still another exemplary embodiment of a liquid crystal display according to the invention, and FIG. 8 is a top plan view illustrating an enlarged portion of the liquid crystal display of FIG. 7.

Figure 8:
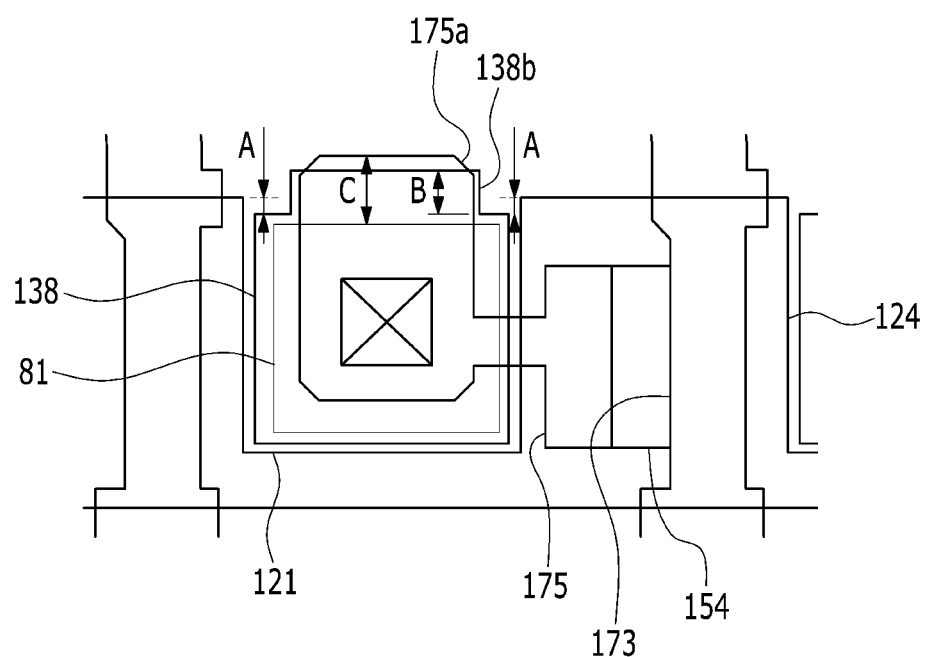
FIG. 8 is a top plan view illustrating an enlarged portion of the liquid crystal display of FIG. 7.

Referring to FIGS. 7 and 8, the liquid crystal display is substantially the same as the liquid crystal display described with reference to FIGS. 1 to 4. A detailed description of the similar constituent elements will be omitted.

Referring to FIGS. 7 and 8, similar to the liquid crystal display described with reference to FIGS. 1 to 4, a first direction first interval A between a second opening 138 of a common electrode 270, and a gate electrode 124 at a portion adjacent to the gate electrode 124 is about 0 μm to about 6 μm. More particularly, the first interval A taken perpendicularly (e.g., the first direction) between a first edge 124*a* parallel to a gate line 121 among edges of the gate electrode, and a second edge 138*a* adjacent to a first edge 124*a* of the gate electrode 124 among edges parallel to the gate line 121 among edges of the second opening 138 of the common electrode 270 is about 0 μm to about 6 μm. That is, the second edge 138*a* of the second opening 138 of the common electrode 270 is disposed to be closer to the drain electrode 175 than the first edge 124*a* of the gate electrode 124.

However, in the liquid crystal display described with reference to FIGS. 7 and 8, unlike the exemplary embodiment described with reference to FIGS. 1 to 4, the second opening 138 of the common electrode 270 includes a first expanded portion 138*b*. That is, the second opening 138 includes the first expanded portion 138*b* positioned at a center portion of the second opening 138 with respect to the second direction and spaced apart from a first direction extending second opening 138 edge portion adjacent to the gate electrode 124. For the first expanded portion 138*b*, a first direction interval between a first opening 81 of an organic layer 180*b* and the second opening 138 of the common electrode 270 is larger than a first direction interval between the first opening 81 and the second opening 138 at the second edge 138*a* adjacent to the gate electrode 124. More particularly, a first direction difference B between the interval between the edge of the first expanded portion 138*b* and the first opening 81 of the organic layer 180*b*, and an interval between the first opening 81 and the second opening 138 at the second edge 138*a* adjacent to the gate electrode 124 is about 1 μm to about 5 μm.

As described above, the interval between the first opening 81 of the organic layer 180*b* and the second opening 138 of the common electrode 270 at the first expanded portion 138*b* is disposed to be relatively wide, so that mislocation of the second opening 138 of the common electrode 270 by a step difference of the organic layer 180*b* may be reduced or effectively prevented.

Further, in the liquid crystal display described with reference to FIGS. 7 and 8, the drain electrode 175 includes a second expanded portion 175*a* overlapping the first expanded portion 138*b* of the second opening 138 of the common electrode 270.

The second expanded portion 175*a* of the drain electrode 175 serves to additionally reduce or effectively prevent light leakage generated at a surrounding region of the first expanded portion 138*b* of the second opening 138 of the common electrode 270. A second interval C that is a maximum distance between a second direction extending edge of the second expanded portion 175*a* of the drain electrode 175, and an edge adjacent to the second expanded portion 175*a* among edges of the first opening 81 of the organic layer 180*b* is about 1 μm to 10 μm. Here, the second interval C is an interval measured in a direction (e.g., first direction) perpendicular to a direction in which the gate line 121 is extended (e.g., second direction).

Further, as described above, the first direction first interval A that is taken perpendicularly between the first edge 124*a* parallel to the gate line 121 among the edges of the gate electrode 124, and the second opening 138 second edge 138*a* adjacent to the first edge 124*a* of the gate electrode 124 among the edges parallel to the gate line 121 of the second opening 138 of the common electrode 270 in the portion adjacent to the gate electrode 124 is about 0 μm to about 6 μm. That is, the second edge 138*a* of the second opening 138 of the common electrode 270 is disposed to be closer to the drain electrode 175 than the first edge 124*a* of the gate electrode 124.

As described above, according to one or more exemplary embodiment of the liquid crystal display according to invention, the second edge 138*a* of the second opening 138 of the common electrode 270 is disposed to be adjacent to the first edge 124*a* of the gate electrode 124, and the second edge 138*a* of the second opening 138 of the common electrode 270 is disposed to be closer to the drain electrode 175 than the first edge 124*a* of the gate electrode 124 in the top plan view, so that a second direction interval W1 between the first direction extending edge of the second opening 138 of the common electrode 270 and the drain electrode 175 may be disposed to be relatively narrow. Accordingly, a portion of the common electrode 270 may be disposed in and cover a portion adjacent to the gate electrode 124. Since the common voltage is applied to the common electrode 270, it is possible to reduce or effectively prevent the electric field generated near the gate electrode 124 from influencing to the liquid crystal layer 3 near the gate electrode 124. Accordingly, unnecessary rotation of the liquid crystal molecules of the liquid crystal layer positioned around the region corresponding to the gate electrode 124 due to the influence of the first electric field F1 may be reduced or effectively prevented, thereby reducing or effectively preventing light leakage in the liquid crystal display. Accordingly, even without forming the light blocking member 220 to be relatively wide, light leakage may be reduced or effectively prevented without decreasing the aperture ratio of the liquid crystal display.

All of the aforementioned characteristics of the liquid crystal display described with reference to FIGS. 1 to 4 and FIGS. 5 and 6 are applicable to the liquid crystal display described with reference to FIGS. 7 and 8.

Figure 9:
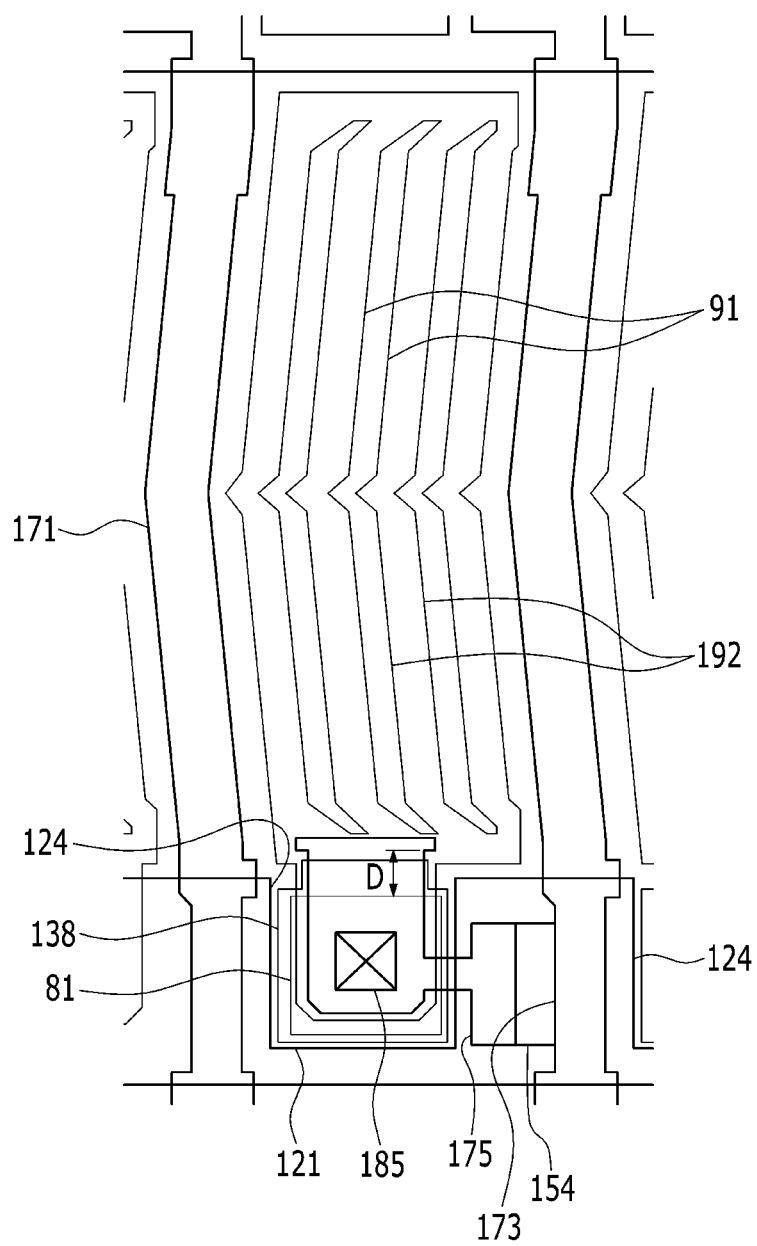
FIG. 9 is a top plan view of yet another exemplary embodiment of a liquid crystal display according to the invention.

A liquid crystal display according to the invention will be described with reference to FIGS. 9 and 10. FIG. 9 is a top plan view of yet another exemplary embodiment of a liquid crystal display according to the invention, and FIG. 10 is a top plan view illustrating an enlarged portion of the liquid crystal display of FIG. 9.

Figure 10:
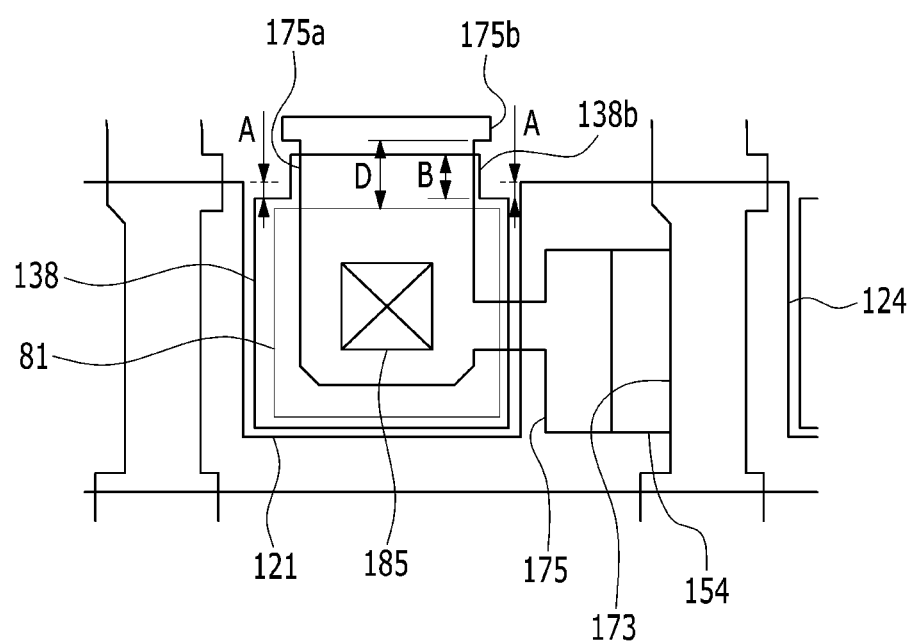
FIG. 10 is a top plan view illustrating an enlarged portion of the liquid crystal display of FIG. 9.

Referring to FIGS. 9 and 10, the liquid crystal display is substantially the same as the liquid crystal display according described with reference to FIGS. 1 to 4. A detailed description of the similar constituent elements will be omitted.

Referring to FIGS. 9 and 10, similar to the liquid crystal display described with reference to FIGS. 1 to 4, a first direction first interval A between a second opening 138 of a common electrode 270 and a gate electrode 124 at a portion adjacent to the gate electrode 124 is about 0 µm to about 6 µm. More particularly, the first interval A taken perpendicularly (e.g., the first direction) between a first edge 124a parallel to a gate line 121 among edges of the gate electrode 124, and a second edge 138a adjacent to a first edge 124a of the gate electrode 124 among edges parallel to the gate line 121 among edges of the second opening 138 of the common electrode 270 is about 0 µm to about 6 µm. That is, the second edge 138a of the second opening 138 of the common electrode 270 is disposed to be closer to the drain electrode 175 than the first edge 124a of the gate electrode 124.

However, in the liquid crystal display described with reference to FIGS. 9 and 10, unlike the exemplary embodiment described with reference to FIGS. 1 to 4, the second opening 138 of the common electrode 270 includes a first expanded portion 138b. That is, the second opening 138 includes the first expanded portion 138b positioned at a center portion of the second opening 138 with respect to the second direction and spaced apart from a first direction extending second opening 138 edge portion adjacent to the gate electrode 124. For the first expanded portion 138b, a first direction interval between a first opening 81 of an organic layer 180b and the second opening 138 of the common electrode 270 is larger than a first direction interval between the first opening 81 and the second opening 138 at the second edge 138a adjacent to the gate electrode 124. More particularly, a first direction difference B between the interval between the edge of the first expanded portion 138b and the first opening 81 of the organic layer 180b, and an interval between the first opening 81 and the second opening 138 at the second edge 138a adjacent to the gate electrode 124 is about 1 µm to about 5 µm.

As described above, the interval between the first opening 81 of the organic layer 180b and the second opening 138 of the common electrode 270 at the first expanded portion 138b is disposed to be relatively wide, so that mislocation of the second opening 138 of the common electrode 270 by a step difference of the organic layer 180b may be reduced or effectively prevented.

Further, in the liquid crystal display described with reference to FIGS. 9 and 10, the drain electrode 175 includes a second expanded portion 175a overlapping the first expanded portion 138b of the second opening 138 of the common electrode 270, and further includes a third expanded portion 175b extended from the second expanded portion 175a. The third expanded portion 175b has a rectangular shape in the top plan view. The third expanded portion 175b may include only straight or linear portions, but the invention is not limited thereto.

The second expanded portion 175a and the third expanded portion 175b of the drain electrode 175 serve to additionally reduce or effectively prevent light leakage generated at a surrounding region of the first expanded portion 138b of the second opening 138 of the common electrode 270. A third interval D that is a minimum interval between a second direction extending edge of the third expanded portion 175b of the drain electrode 175 and the first opening 81 of the organic layer 180b may be about 1 µm to about 10 µm. Here, the third interval D is a distance measured in a direction (e.g., first direction) perpendicular to a direction in which the gate line 121 is extended (e.g., second direction).

Further, as described above, the first direction first interval A that is taken perpendicularly between the first edge 124a parallel to the gate line 121 among the edges of the gate electrode 124, and the second opening 138 second edge 138a adjacent to the first edge 124a of the gate electrode 124 among the edges parallel to the gate line 121 among the edges of the second opening 138 of the common electrode 270 in the portion adjacent to the gate electrode 124 is about 0 µm to about 6 µm. That is, the second edge 138a of the second opening 138 of the common electrode 270 is disposed to be closer to the drain electrode 175 than the first edge 124a of the gate electrode 124.

As described above, according to one or more exemplary embodiment of the liquid crystal display according to the invention, the second edge 138a of the second opening 138 of the common electrode 270 is disposed to be adjacent to the first edge 124a of the gate electrode 124 in the top plan view, and the second edge 138a of the second opening 138 of the common electrode 270 is disposed to be closer to the drain electrode 175 than the first edge 138a of the gate electrode 124, so that a second direction interval W1 between the first direction extending edge of the second opening 138 of the common electrode 270 and the drain electrode 175 may be disposed to be relatively narrow. Accordingly, a portion of the common electrode 270 may be disposed in and cover a portion adjacent to the gate electrode 124. Since the common voltage is applied to the common electrode 270, it is possible to reduce or effectively prevent the electric field generated near the gate electrode 124 from influencing the liquid crystal layer 3 near the gate electrode 124. Accordingly, unnecessary rotation of the liquid crystal molecules of the liquid crystal layer positioned around the region corresponding to the gate electrode 124 due to the influence of the first electric field F1 may be reduced or effectively prevented, thereby reducing or effectively preventing light leakage in the liquid crystal display. Accordingly, even without forming the light blocking member 220 to be relatively wide, light leakage may be reduced or effectively prevented without decreasing the aperture ratio of the liquid crystal display.

All of the aforementioned characteristics of the liquid crystal display described with reference to FIGS. 1 to 4, FIGS. 5 and 6, and FIGS. 7 and 8 are applicable to the liquid crystal display described with reference to FIGS. 9 and 10.

Figure 11:
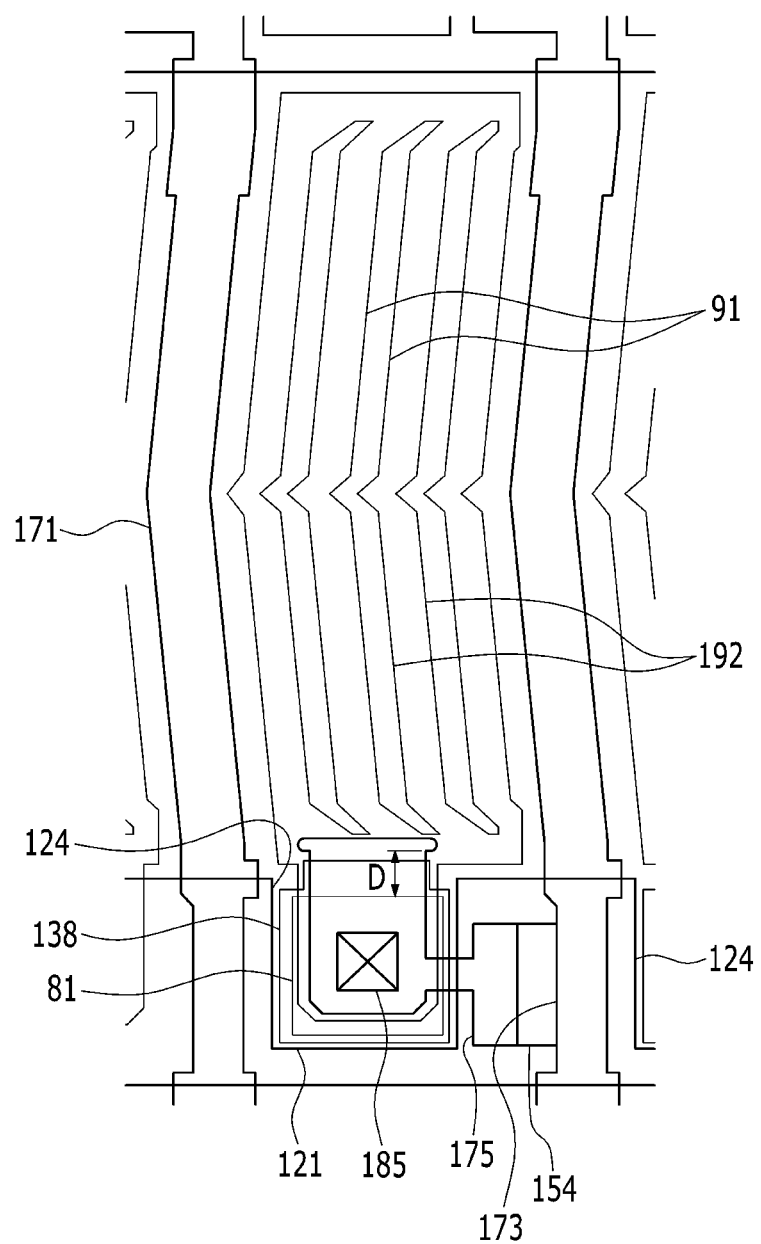
FIG. 11 is a top plan view of yet another exemplary embodiment of a liquid crystal display according to the invention.

A liquid crystal display according to the invention will be described with reference to FIGS. 11 and 12. FIG. 11 is a top plan view of yet another exemplary embodiment of a liquid crystal display according to the invention, and FIG. 12 is a top plan view illustrating an enlarged portion of the liquid crystal display of FIG. 11.

Figure 12:
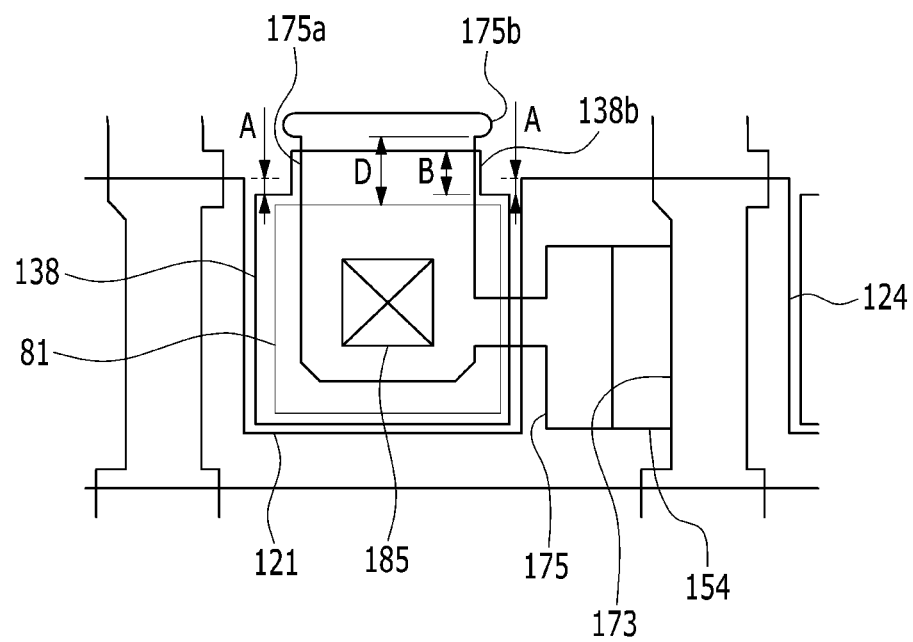
FIG. 12 is a top plan view illustrating an enlarged portion of the liquid crystal display of FIG. 11.

Referring to FIGS. 11 and 12, the liquid crystal display is substantially the same as the liquid crystal display described with reference to FIGS. 1 to 4. A detailed description of the similar constituent elements will be omitted.

Referring to FIGS. 11 and 12, similar to the liquid crystal display described with reference to FIGS. 1 to 4, a first direction first interval A between a second opening 138 of a common electrode 270 and a gate electrode 124 at a portion adjacent to the gate electrode 124 is about 0 µm to about 6 µm. More particularly, the first interval A taken perpendicularly (e.g., first direction) between a first edge 124a parallel to a gate line 121 among edges of the gate electrode 124, and a second edge 138a adjacent to a first edge 124a of the gate electrode 124 among edges parallel to the gate line 121 among edges of the second opening 138 of the common electrode 270 is about 0 µm to about 6 µm. That is, the second edge 138a of the second opening 138 of the common electrode 270 is disposed to be closer to the drain electrode 175 than the first edge 138a of the gate electrode 124.

However, in the liquid crystal display described with reference to FIGS. 11 and 12, unlike the exemplary embodiment described with reference to FIGS. 1 to 4, the second opening 138 of the common electrode 270 includes a first expanded portion 138b. That is, the second opening 138 includes the first expanded portion 138b positioned at a center portion of the second opening 138 with respect to the second direction and spaced apart from a first direction extending edge portion adjacent to the gate electrode 124. For the first expanded portion 138b, a first direction interval between a first opening 81 of an organic layer 180b and the second opening 138 of the common electrode 270 is larger than a first direction interval between the first opening 81 and the second opening 138 at the second edge 138a adjacent to the gate electrode 124. More particularly, a first direction difference B between the interval between the edge of the first expanded portion 138b and the first opening 81 of the organic layer 180b, and an interval between the first opening 81 and the second opening 138 at the second edge 138a adjacent to the gate electrode 124 is about 1 μm to about 5 μm.

As described above, the interval between the first opening 81 of the organic layer 180b and the second opening 138 of the common electrode 270 at the first expanded portion 138b is disposed to be relatively wide, so that mislocation of the second opening 138 of the common electrode 270 by a step difference of the organic layer 180b may be reduced or effectively prevented.

Further, in the liquid crystal display described with reference to FIGS. 11 and 12, the drain electrode 175 includes a second expanded portion 175a overlapping the first expanded portion 138b of the second opening 138 of the common electrode 270, and further includes a third expanded portion 175b extended from the second expanded portion 175a. The third expanded portion 175b includes a straight portion and a curved portion.

The second expanded portion 175a and the third expanded portion 175b of the drain electrode 175 serve to additionally reduce or effectively prevent light leakage generated in a surrounding region of the first expanded portion 138b of the second opening 138 of the common electrode 270. A third interval D that is a minimum interval between a second direction extending edge of the third expanded portion 175b of the drain electrode 175 and the first opening 81 of the organic layer 180b may be about 1 μm to about 10 μm. Here, the third interval D is a distance measured in a direction (e.g., first direction) perpendicular to a direction in which the gate line 121 is extended (e.g., second direction).

Further, as described above, the first direction first interval A that is taken perpendicularly between the first edge 124a parallel to the gate line 121 among the edges of the gate electrode 124, and the second edge 138a adjacent to the first edge 124a of the gate electrode 124 among the edges parallel to the gate line 121 among the edges of the second opening 138 of the common electrode 270 in the portion adjacent to the gate electrode 124 is about 0 μm to about 6 μm. That is, the second edge 138a of the second opening 138 of the common electrode 270 is disposed to be closer to the drain electrode 175 than the first edge 124a of the gate electrode 124.

As described above, according to one or more exemplary embodiment of the liquid crystal display according to the invention, the second edge 138a of the second opening 138 of the common electrode 270 is disposed to be adjacent to the first edge 124a of the gate electrode 124 in the top plan view, and the second edge 138a of the second opening 138 of the common electrode 270 is disposed to be closer to the drain electrode 175 than the first edge 124a of the gate electrode 124, so that a second direction interval W1 between the first direction extending edge of the second opening 138 of the common electrode 270 and the drain electrode 175 may be disposed to be relatively narrow. Accordingly, a portion of the common electrode 270 may be disposed in and cover a portion adjacent to the gate electrode 124. Since the common voltage is applied to the common electrode 270, it is possible to reduce or effectively prevent the electric field generated near the gate electrode 124 from influencing the liquid crystal layer 3 near the gate electrode 124. Accordingly, unnecessary rotation of the liquid crystal molecules of the liquid crystal layer positioned around the region corresponding to the gate electrode 124 due to the influence of the first electric field F1 may be reduced or effectively prevented, thereby reducing or effectively preventing light leakage in the liquid crystal display. Accordingly, even without forming the light blocking member 220 to be relatively wide, light leakage may be reduced or effectively prevented without decreasing the aperture ratio of the liquid crystal display.

All of the aforementioned characteristics of the liquid crystal display described with reference to FIGS. 1 to 4, FIGS. 5 and 6, FIGS. 7 and 8 and FIGS. 9 and 10 are applicable to the liquid crystal display described with reference to FIGS. 11 and 12.

Figure 13:
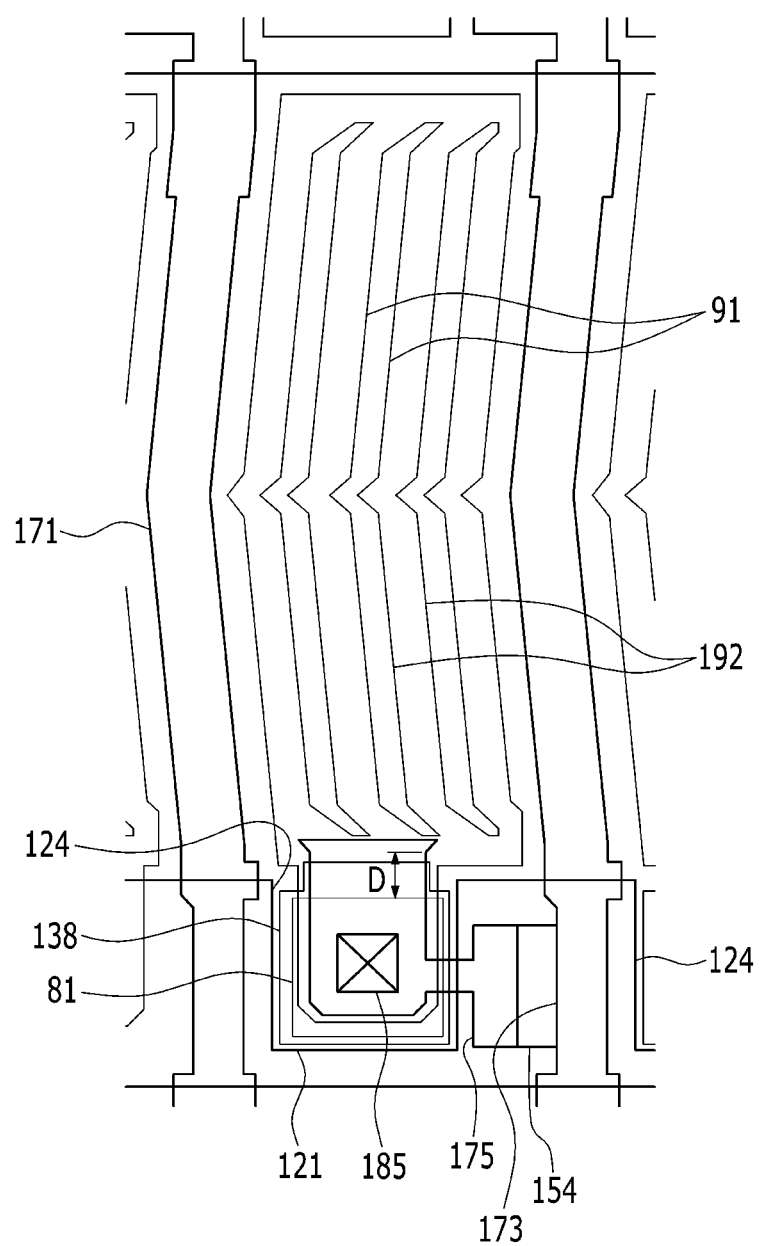
FIG. 13 is a top plan view of yet another exemplary embodiment of a liquid crystal display according to the invention.

A liquid crystal display according to the invention will be described with reference to FIGS. 13 and 14. FIG. 13 is a top plan view of yet another exemplary embodiment of a liquid crystal display according to the invention, and FIG. 14 is a top plan view illustrating an enlarged portion of the liquid crystal display of FIG. 13.

Figure 14:
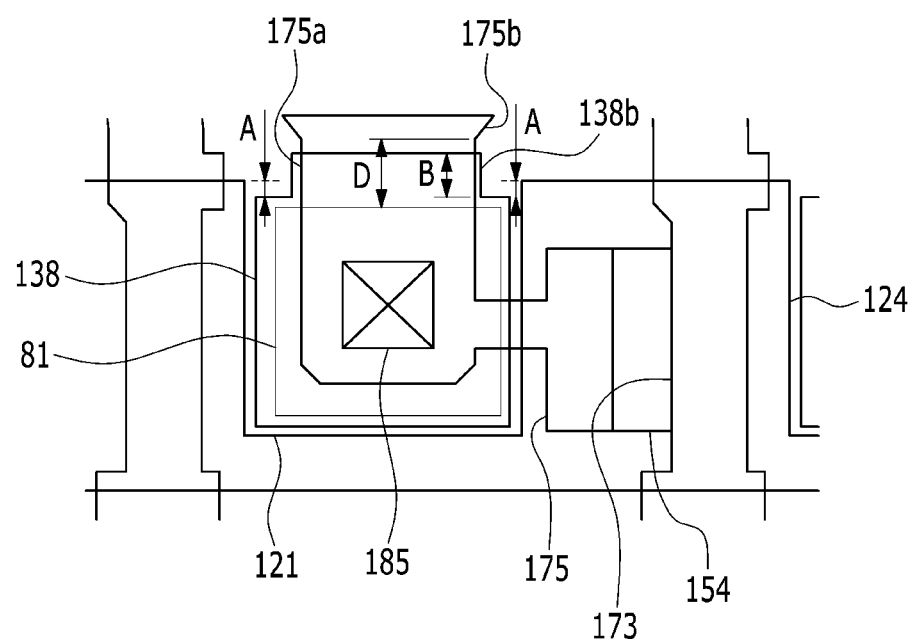
FIG. 14 is a top plan view illustrating an enlarged portion of the liquid crystal display of FIG. 13.

Referring to FIGS. 13 and 14, the liquid crystal display is substantially the same as the liquid crystal display described with reference to FIGS. 1 to 4. A detailed description of the similar constituent elements will be omitted.

Referring to FIGS. 13 and 14, similar to the liquid crystal display described with reference to FIGS. 1 to 4, a first direction first interval A between a second opening 138 of a common electrode 270 and a gate electrode 124 at a portion adjacent to the gate electrode 124 is about 0 μm to about 6 μm. More particularly, the first interval A that is taken perpendicularly (e.g., first direction) between a first edge 124a parallel to a gate line 121 among edges of the gate electrode 124, and a second edge 138a adjacent to a first edge 124a of the gate electrode 124 among edges parallel to the gate line 121 among edges of the second opening 138 of the common electrode 270 is about 0 μm to about 6 μm. That is, the second edge 138a of the second opening 138 of the common electrode 270 is disposed to be closer to the drain electrode 175 than the first edge 124a of the gate electrode 124.

However, in the liquid crystal display described with reference to FIGS. 13 and 14, unlike the exemplary embodiment described with reference to FIGS. 1 to 4, the second opening 138 of the common electrode 270 includes a first expanded portion 138b. That is, the second opening 138 includes the first expanded portion 138b positioned at a center portion of the second opening 138 with respect to the second direction and spaced apart from a first direction extending edge portion adjacent to the gate electrode 124. For the first expanded portion 138b, a first direction interval between a first opening 81 of an organic layer 180b and the second opening 138 of the common electrode 270 is larger than a first direction interval between the first opening 81 and the second opening 138 at the second edge 138a adjacent to the gate electrode 124. More particularly, a first direction difference B between the interval between the edge of the first expanded portion 138b and the first opening 81 of the organic layer 180b, and an interval between the first opening 81 and the second opening 138 at the second edge 138a adjacent to the gate electrode 124 is about 1 μm to about 5 μm.

As described above, the interval between the first opening 81 of the organic layer 180b and the second opening 138 of the common electrode 270 at the first expanded portion 138b is disposed to be relatively wide, so that mislocation of the second opening 138 of the common electrode 270 by a step difference of the organic layer 180b may be reduced or effectively prevented.

Further, in the liquid crystal display described with reference to FIGS. 13 and 14, the drain electrode 175 includes a second expanded portion 175a overlapping the first expanded portion 138b of the second opening 138 of the common electrode 270, and further includes a third expanded portion 175b extended from the second expanded portion 175a. The third expanded portion 175b includes a straight portion and an oblique portion. As described above, the third expanded portion 175b of the drain electrode 175a may have a polygonal and/or overall rectilinear (e.g., non-curved) shape.

The second expanded portion 175a and the third expanded portion 175b of the drain electrode 175 serve to additionally reduce or effectively prevent light leakage generated in a surrounding region of the first expanded portion 138b of the second opening 138 of the common electrode 270. A third interval D that is a minimum interval between a second direction extending edge of the third expanded portion 175b of the drain electrode 175 and the first opening 81 of the organic layer 180b may be about 1 μm to about 10 μm. Here, the third interval D is a distance measured in a direction (e.g., first direction) perpendicular to a direction in which the gate line 121 is extended (e.g., second direction).

Further, as described above, the first direction first interval A that is taken perpendicularly between the first edge 124a parallel to the gate line 121 among the edges of the gate electrode 124, and the second edge 138a adjacent to the first edge 124a of the gate electrode 124 among the edges parallel to the gate line 121 among the edges of the second opening 138 of the common electrode 270 in the portion adjacent to the gate electrode 124 is about 0 μm to about 6 μm. That is, the second edge 183a of the second opening 138 of the common electrode 270 is disposed to be closer to the drain electrode 175 than the first edge 124a of the gate electrode 124.

As described above, according to one or more exemplary embodiment of the liquid crystal display according to the invention, the second edge 183a of the second opening 183 of the common electrode 270 is disposed to be adjacent to the first edge 124a of the gate electrode 124 in the top plan view, and the second edge 183a of the second opening 138 of the common electrode 270 is disposed to be closer to the drain electrode 175 than the first edge 124a of the gate electrode 124, so that a second direction interval W1 between the first direction extending edge of the second opening 138 of the common electrode 270 and the drain electrode 175 may be disposed to be relatively narrow. Accordingly, a portion of the common electrode 270 may be disposed in and cover a portion adjacent to the gate electrode 124. Since the common voltage is applied to the common electrode 270, it is possible to reduce or effectively prevent the electric field generated near the gate electrode 124 from influencing the liquid crystal layer 3 near the gate electrode 124. Accordingly, unnecessary rotation of the liquid crystal molecules of the liquid crystal layer positioned around the region corresponding to the gate electrode 124 due to the influence of the first electric field F1 may be reduced or effectively prevented, thereby reducing or effectively preventing light leakage in the liquid crystal display. Accordingly, even without forming the light blocking member 220 to be relatively wide, light leakage may be reduced or effectively prevented without decreasing the aperture ratio of the liquid crystal display.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:
1. A liquid crystal display, comprising:
a first substrate;
a gate line including a gate electrode on the first substrate;
a data line extending in a first direction and including a source electrode on the first substrate;
a drain electrode on the first substrate;
an insulating layer on the gate line, the data line and the drain electrode;
a first electrode on the insulating layer, and a first opening defined in the first electrode;
a passivation layer on the first electrode and in which a contact hole is defined overlapping the drain electrode; and
a second electrode on the passivation layer,
wherein
a maximum width of the gate line in the first direction defines a first width,
a minimum width of the gate line in the first direction defines a second width,
a maximum width of the first opening in the first direction defines a third width, and
the first width of the gate line is greater than a sum of the second width of the gate line and the third width of the first opening.
2. The liquid crystal display of claim 1, wherein:
the first electrode has a plate shape,
the second electrode includes a plurality of branch electrodes,
the plurality of branch electrodes of the second electrode overlaps the first electrode, and
the second electrode is connected to the drain electrode through the contact hole.
3. The liquid crystal display of claim 2, wherein:
the insulating layer has a second opening,
the contact hole overlaps the first opening and the second opening.
4. The liquid crystal display of claim 3, wherein:
the gate line extends in a second direction perpendicular to the first direction,
wherein, in a top plan view,
an interval taken between a first edge among edges of the gate electrode and a second edge among edges of the first opening, is about 0 micrometer to about 6 micrometers, and
the first edge is parallel to the second direction and, the second edge is parallel to the second direction and adjacent to the first edge.
5. The liquid crystal display of claim 4, wherein in the top plan view:

the first opening of the first electrode includes a first expanded portion extended in the first direction, and smaller in the second direction than a remainder of the first opening of the first electrode in the second direction, and a first interval taken in the first direction between a second direction extended distal edge of the first expanded portion and the second opening of the insulating layer, is larger than a second interval taken in the first direction between the second edge of the first opening adjacent to the gate electrode and the second opening.

6. The liquid crystal display of claim 5, wherein:

a difference between the first interval and the second interval is about 1 micrometer to about 5 micrometers.

7. The liquid crystal display of claim 5, wherein:

the drain electrode includes a second expanded portion overlapping the first expanded portion of the first opening, and extended in the first direction further than the second direction extended distal edge of the first expanded portion.

8. The liquid crystal display of claim 7, wherein:

a maximum interval between a third edge of the second opening and the second expanded portion of the drain electrode is about 1 micrometer to about 10 micrometers, wherein the third edge of the second opening is an edge adjacent to the second expanded portion of the drain electrode among edges of the second opening.

9. The liquid crystal display of claim 5, wherein:

the drain electrode includes a third expanded portion extended in the first direction from the second expanded portion, and larger in the second direction than a remainder of the second expanded portion of the drain electrode in the second direction.

10. The liquid crystal display of claim 9, wherein:

a minimum interval between a fourth edge of the second opening and the third expanded portion of the drain electrode is about 1 micrometer to about 10 micrometers, wherein the fourth edge of the second opening is an edge adjacent to the third expanded portion of the drain electrode among edges of the second opening.

\* \* \* \* \*